United States Patent Office 3,458,532
Patented July 29, 1969

3,458,532
PRODUCTION OF LACTONES AND KETO ACIDS
Percy Hayden, Norton-on-Tees, England, assignor to Imperial Chemical Industries Limited, London, England, a corporation of Great Britain
No Drawing. Filed Sept. 13, 1965, Ser. No. 487,070
Claims priority, application Great Britain, Sept. 17, 1964, 38,049/64; Dec. 21, 1964, 51,894/64
Int. Cl. C07d *5/10, 7/10;* C07c *51/14*
U.S. Cl. 260—343.6     14 Claims This invention relates to unsaturated lactones and keto acids.

According to the invention keto acids and/or unsaturated lactones are produced by reacting ethylene or propylene, at a partial pressure of at least 100 atmospheres, with carbon monoxide in the presence of a catalyst comprising a palladium salt of a strong acid, preferably the chloride, bromide or iodide in solution in a liquid phase in the substantial absence of free acid or base. The reaction is particularly effective with ethylene.

By "strong acid" in this specification, is meant an acid having a dissociation constant for its first hydrogen ion in water greater than that of acetic acid. Solvents for the palladium salt in the present reaction are neutral compounds, that is compounds which are neither acidic nor basic (for example the alcohols are unsuitable for this purpose) examples of suitable compounds being amides with no replaceable hydrogen atoms, such as dimethyl formamide, dimethyl acetamide or dimethyl propionamide, hydrocarbons which do not readily carbonylate under the reaction conditions, such as the paraffins and aromatic hydrocarbons, chlorinated hydrocarbons such as chloroform, carbon tetrachloride or chlorobenzene, nitro paraffins, for example nitromethane, nitro aromatics such as nitrobenzene, certain sulphur compounds such as the sulpholanes, sulphones or sulphoxides, or preferably nitriles, for example acetonitrile, propionitrile, adiponitrile or benzonitrile. Certain of such solvents are capable of acting as weak ligands; that is compounds capable of combining with palladium to give complexes from which the ligand is replaceable under the reaction conditions by ethylene or propylene. It is particularly preferred to use such weak ligands, especially nitromethane, acetonitrile or propionitrile, as solvents.

If it is desired to produce lacetones, nucleophilic compounds, such as water, are preferably absent from the reaction medium, though if keto-acids are the desired product, a minor proportion of water of at most ten molecules per palladium atom is required.

It is preferred, particularly when a nitrile, for example, a lower alkyl nitrile is present, that bromide or iodide is provided in ionisable form. Bromide ions are particularly effective.

It will be appreciated that during the course of the reaction the catalyst probably consists of complexes of palladium ions with carbon monoxide and/or ethylene or propylene together with anions from the palladium salt which may or may not form part of the complex.

Halide in ionisable form, for example bromide or iodide, may suitably be provided by the palladium salt or by addition of an alkali or alkaline earth metal halide such as lithium or sodium bromide or iodide. When no ligand is present a high proportion of halide in ionisable form to palladium is preferably provided in the reaction medium, suitably such proportion being at least 25% and preferably 50% greater than the stoichiometric ratio corresponding to a valency for the palladium of two. When a weak ligand such as a nitrile, particularly a lower alkyl nitrile is present, the stoichiometric ratio of halide in ionisable form to palladium may be used provided that an excess, preferably of at least 50% and more preferably at least 100% to 200% of the weak ligand is present over that required to give an isolatable complex. By the words "ionisable form" is meant a form from which the appropriate ions can be derived by solution in water, and includes the element when present as ions.

In the liquid phase present during the process, suitably from $10^{-3}$ to 2 gram atoms of palladium are present per litre of liquid phase. Preferably the concentration is from $10^{-1}$ to 1 gram atoms per litre, however.

Weak ligands such as the mono nitro compounds or mono nitriles of the lower paraffins having at most four carbon atoms may be necessary to dissolve the palladium compound, or to reduce the tendency to form high molecular weight by-products. Strong ligands, such as the phosphines and phosphite esters should be absent.

Suitable temperatures for the present reaction are up to 200° C., and pressures up to 3,000 atmospheres may be used. Particularly suitable temperatures when the halide present is chloride or bromide, are in the range from 120° to 200° C., when the halide is iodide the temperature is preferably in the range 80° to 120° C. Partial pressures of carbon monoxide of at least 1 atmosphere are preferably employed though a great excess may be tolerated. The partial pressure of the olefine is preferably at least 200 atmospheres when the olefine is gaseous and more preferably at least 500 atmospheres particularly in the case of ethylene.

It is preferred to have a ratio of 100 parts of olefine to at least 1 part of carbon monoxide by molar proportion; from ten parts of olefine to 0.1 part of olefine per part of carbon monoxide by molar proportion are preferably used. It will be appreciated that since the molar ratio of carbon monoxide to olefine consumed in the reaction is normally 1:1, the amount of product will be limited if the total quantity of carbon monoxide supplied is small. Preferably hydrogen is excluded. Among the products of this reaction which may be secured when ethylene is reacted with carbon monoxide are alpha, beta-homoangelica lactone, beta-gamma homoangelica lactone, and gamma-delta-homoangelica lactone. The corresponding keto acids which may be formed by the hydrolysis of the lactones tend to occur in the presence of small quantities of water, for example 4 keto hexanoic acid.

The following reactions were carried out in glass lined vessels.

EXAMPLE 1

(a) 40 grams of a 1.0 molar solution of $Li_2PdCl_4$ in acetonitrile were contacted with an ethylene-carbon monoxide mixture in a ratio of 45:55 at a total initial pressure of 785 atmospheres at 125° C. for 90 minutes. The pressure dropped to 580 atmospheres.

(b) 40 grams of a 1.0 molar solution of $Li_2PdCl_4$ in acetonitrile were contacted with ethylene:carbon monoxide mixture in a ratio of 45:55 at a total pressure of 1000 atmospheres at 150° C. for 210 minutes.

In both of the above cases alpha-beta homoangelica lactone was produced in substantial yield. Additionally the product included some propionic acid, a higher lactone $C_9H_{12}O_3$, beta-gamma homoangelica lactone, gamma-delta homoangelica lactone and a trace of beta-chloropropionyl chloride.

EXAMPLE 2

A solution of 7.2 grams of palladium chloride in 40 mls. of acetonitrile was contacted with an ethylene:carbon monoxide mixture (45:55) for 3 hours at 1000 atmospheres and 150° C. The pressure dropped to 375 atmospheres.

The product, which contained much solid was filtered and the solvent was removed from the filtrate to give 15.3 grams of a brown liquid, distillation of which gave 1.5 grams of alpha-beta homoangelica lactone (33% yield based on PdCl$_2$) and a higher boiling product (about 3.0 grams) consisting of a mixture of 4-keto hexanoic acid and its acid chloride.

EXAMPLE 3

A solution of palladium iodide (3.6 grams) and lithium iodide (2.7 grams) in acetonitrile (40 mls.) was contacted with an equimolar mixture of ethylene and carbon monoxide at 1000 atmospheres and 100° C. for three hours. A pressure drop of 250 atmospheres occured during this period.

Removal of the acetonitrile gave a dark brown oil (15.5 grams) which was chromatogrammed on alumina. Elution with benzene/ethanol (80:20 by volume) gave a pale yellow oil (3.45 grams) which was recovered from the eluate, tarry matter being left near the top of the column. Distillation of the eluted oil gave 1.1 grams of homoangelica lactones.

EXAMPLE 4

A solution of PdBr$_2$ (5.7 grams) and LiBr (3.5 grams) in acetonitrile (35 mls.) was contacted with an equimolar mixture of ethylene and carbon monoxide at 1000 atmospheres and 120° C. A volume of about 172 ccs. of this gas at 1000 atmospheres and 120° C. was absorbed.

Removal of the solvent from the product gave a brown oil, which on distillation gave 15 grams of homoangelica lactones (a mixture of isomers).

EXAMPLE 5

A mixture of palladium bromide (0.6 gm.) propylene (8.4 gms.) and acetonitrile (20 mls.) was contacted with carbon monoxide at 150° C. and 1500 atmospheres for 2 hours. The acetonitrile was removed by reducing the pressure to 15 mm. at room temperature and a thick tar remained which on distillation at a pressure of 0.5 mm. yielded 0.075 gm. of a mixture of unsaturated lactones of formula $C_8H_{12}O_2$.

EXAMPLE 6

A mixture of palladium bromide (0.6 gm.) and acetonitrile (20 mls.) was contacted with a mixture of carbon monoxide and ethylene (60:40 molar ratio) at 150° C. at a total pressure of 2000 atmospheres for 2 hours. A drop in pressure of 180 atmospheres was observed during the course of 2 hours, after which time no further pressure drop occurred. Removal of solvent from the mixture gave a brown oil (4.1 gms.) which on distillation under reduced pressure gave a mixture of homoangelica lactones (1.95 gms. representing a yield of 7.5 moles per mole of palladium bromide).

EXAMPLE 7

A mixture of palladium bromide (06. gm.) dissolved in nitromethane (20 mls.) was contacted with a mixture of carbon monoxide and ethylene (60:40 molar ratio) at 150° C. and 1300 atmospheres pressure for 2 hours.

Removal of the solvent from the mixture gave an oil (2.2 gms.) which on distillation gave propionic acid (0.45 gm.), homoangelica lactones (0.32 gm.) and 4-keto-hexanoic acid (0.56 gm.).

I claim:
1. A process for the production of homoangelica lactones and the said lactones substituted with two methyl groups which comprises reacting an olefine selected from ethylene and propylene, at a partial pressure of at least 100 atmospheres, with carbon monoxide in the presence of a catalyst comprising a palladium salt of a strong acid in solution in a liquid phase, under substantially acid and base free conditions.
2. A process according to claim 1 in which the olefine is ethylene.
3. A process according to claim 2 in which the palladium salt is the chloride, bromide or iodide.
4. A process according to claim 2 which is carried out in the presence of a neutral solvent.
5. A process according to claim 4 in which the solvent is nitromethane, acetonitrile or propionitrile.
6. A process according to claim 4 which is carried out in the substantial absence of water.
7. A process according to claim 1 which is carried out in the presence of a minor amount of water, the said amount being at most ten moles of water per gram atom of palladium and the product obtained also contains 4-keto-hexanoic acid and said acid substituted with two methyl groups.
8. A process according to claim 4, in which a lower alkyl nitrile and bromide or iodide in ionisable form are provided.
9. A process according to claim 3 in which at least three halide atoms in ionisable form are provided to each palladium atom.
10. A process according to claim 4 in which, when chloride or bromide is provided in ionisable form the temperature is in the range of from 120° to 200° C.
11. A process according to claim 4 in which, when iodide is provided in ionisable form the temperature is in the range of from 80° to 120° C.
12. A process according to claim 1 in which the partial pressure of the ethylene or propylene is at least 200 atmospheres.
13. A process according to claim 1 in which the ratio by molar proportions of ethylene or propylene to carbon monoxide is from ten parts to 0.1 part of ethylene or propylene to one part of carbon monoxide.
14. A process for the production of homoangelica lactones and said lactones substituted with two methyl groups which comprises heating an olefin selected from the group consisting of ethylene and propylene, at temperature of 50° C. to 200° C. and at a pressure of 100 to 3000 atmospheres with carbon monoxide in the presence of a catalytic amount of a palladium halide.

References Cited

UNITED STATES PATENTS 3,065,242  11/1962  Alderson et al. _____ 260—343.6

ALEX MAZEL, Primary Examiner

J. A. NARCAVAGE, Assistant Examiner

U.S. Cl. X.R.
260—343.5, 533